July 20, 1954  J. R. SNYDER  2,684,132
AUTOMATIC SLACK ADJUSTER
Filed Nov. 19, 1948  4 Sheets-Sheet 1
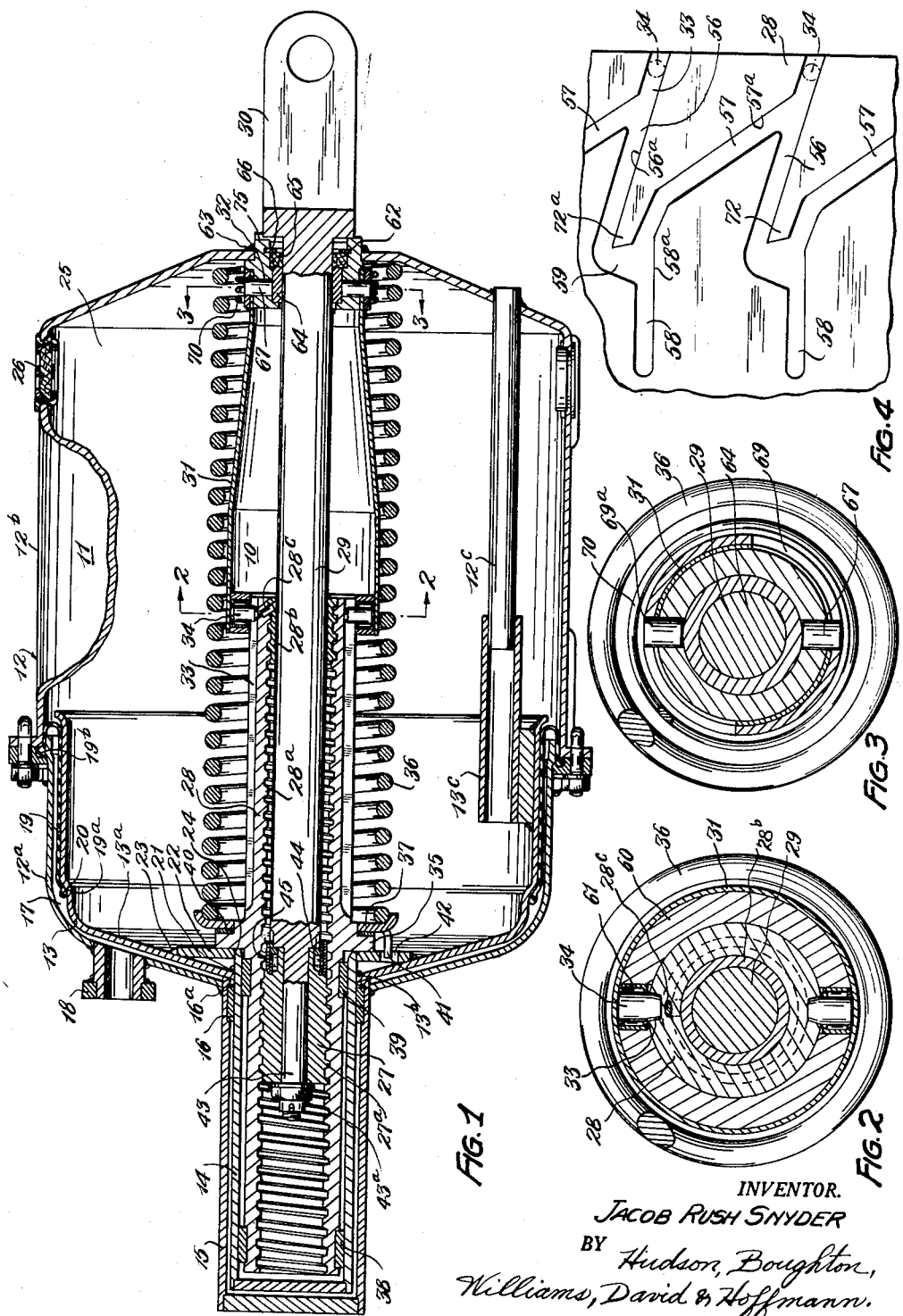
INVENTOR.
JACOB RUSH SNYDER
BY Hudson, Boughton,
Williams, David & Hoffmann.
ATTORNEYS July 20, 1954

J. R. SNYDER 2,684,132

AUTOMATIC SLACK ADJUSTER

Filed Nov. 19, 1948

INVENTOR.
JACOB RUSH SNYDER
BY Hudson, Boughton,
Williams, David & Hoffmann.
ATTORNEYS

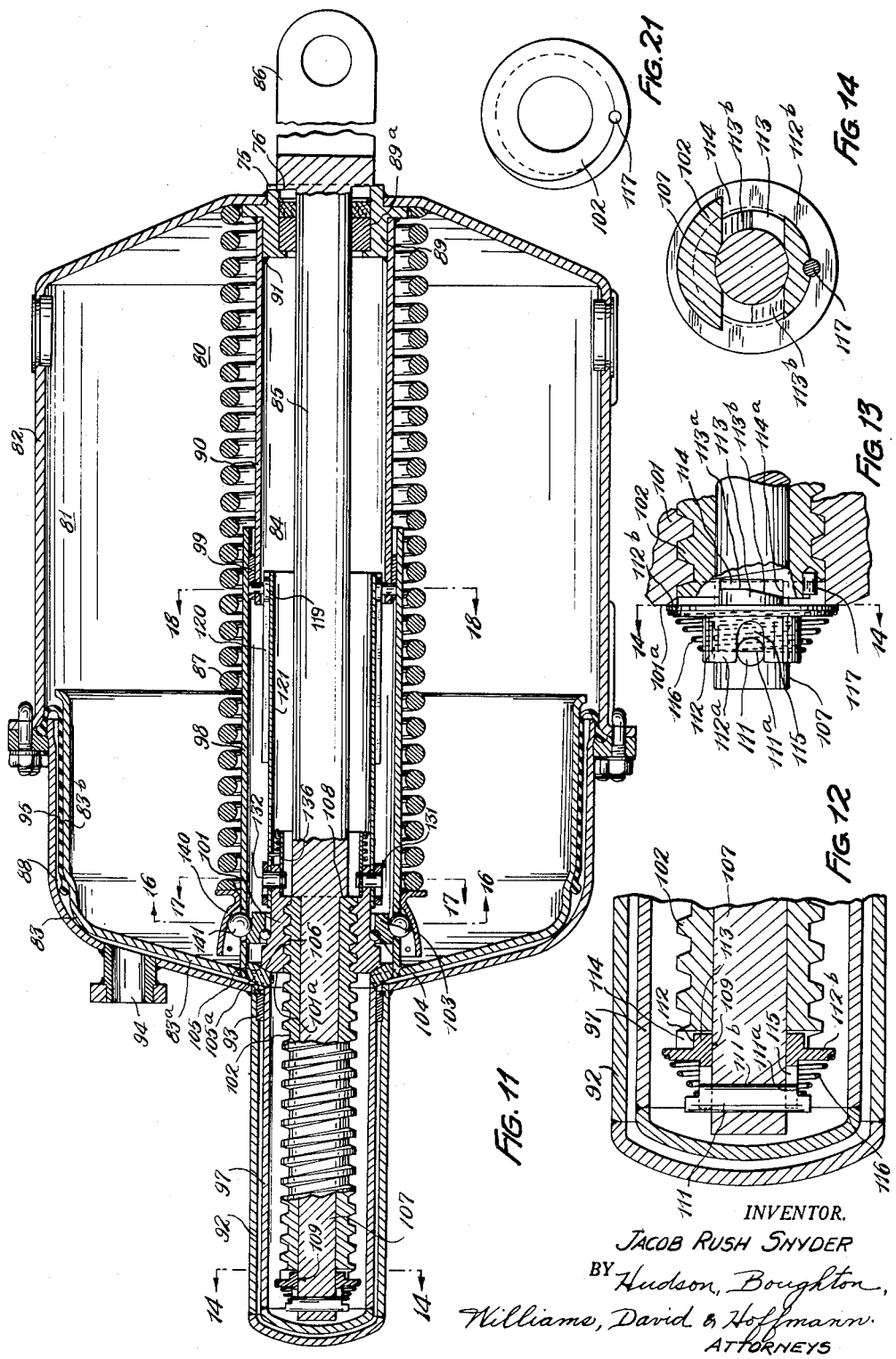

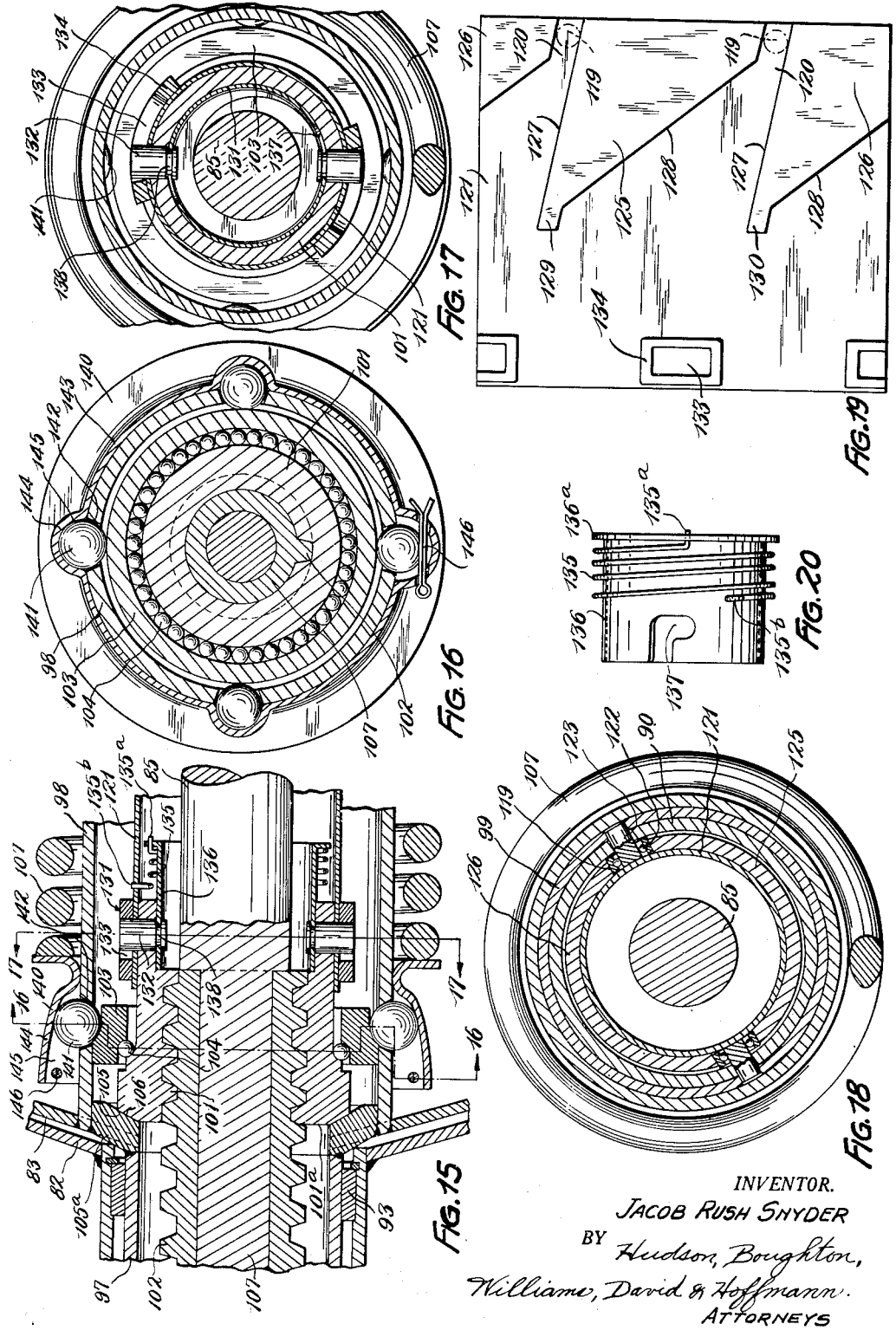

Patented July 20, 1954

2,684,132

UNITED STATES PATENT OFFICE 2,684,132

AUTOMATIC SLACK ADJUSTER

Jacob Rush Snyder, Cleveland, Ohio

Application November 19, 1948, Serial No. 60,946

14 Claims. (Cl. 188—203)

This invention relates to devices for automatically taking up slack which may develop in the rigging of braking apparatus due to wear on the brake shoes or from other causes and, as one of its objects, aims to provide an improved device of this kind.

Another object is to provide an improved slack adjuster in which relative rotation between cooperating screw members for taking up the slack is produced by novel cam means which is actuated by the brake-applying and brake-releasing movements.

A further object is to provide an improved slack adjuster of this character in which the cam means is actuated preliminarily during the brake-applying movement so as to render the device effective to cause slack to be taken up during the brake-releasing movement.

Still another object is to provide an improved slack adjuster of the character mentioned, in which novel means is employed for rendering the take-up action of the screw members ineffective at the end of a predetermined relative travel.

As another of its objects this invention provides an improved slack adjuster in which the slack adjusting mechanism is contained in the housing of a brake cylinder device.

Yet another object is to provide an improved slack adjuster of the type referred to, in which one of the cooperating screw members is carried by a push rod which projects from the brake cylinder for connection with the rigging and the other is actuated by the piston of the brake cylinder.

A further object is to provide an improved slack adjuster of the character mentioned, in which the cam means for producing the slack take-up action is actuated by axial movement imparted to one of the cooperating screw members by the piston of the brake cylinder.

Still another object is to provide a combined brake cylinder device and automatic slack adjuster in which the piston rod of the brake cylinder constitutes one of the cooperating screw members for taking up the slack.

Another object of the invention is to provide a combined brake cylinder and automatic slack adjuster in which the piston rod is hollow and internally threaded, and a push rod extending into the hollow piston rod carries a screw member which cooperates with the internal thread thereof.

As a further object this invention provides an improved mechanism of the character mentioned, in which one of the cooperating screw members is connected with the piston and is rotatable relative thereto for causing the screw members to take up slack in the brake rigging, and in which cam means acts to produce the rotation of said one screw member during the operation of the piston in the brake cylinder.

It is likewise an object of the present invention to provide an improved mechanism of the character referred to, in which the cam means comprises sets of cam and cam follower elements of which one set is connected with the rotatable screw member and the other set is connected with the housing of the brake cylinder.

A further object is to provide an improved mechanism of the character referred to, in which the connection for one set of the cam elements is made through a lost-motion device which is actuated during the brake-applying stroke of the piston to render the cam means effective in producing relative rotation of the screw means for taking up slack during the return stroke of the piston.

It is also an object of this invention to provide an improved slack adjuster of the character mentioned, in which the take-up mechanism can be readily reset by manual adjustment from the outside of the housing or brake cylinder after a predetermined travel of the take-up mechanism has taken place.

Other objects and advantages of the invention will be apparent from the following detailed description and in the accompanying sheets of drawings in which:

Fig. 1 is a longitudinal sectional view taken through a combined brake cylinder device and automatic slack adjuster and which embodies the present invention;

Fig. 2 is a partial transverse sectional view taken through the cam means of the slack adjuster, as indicated by section line 2—2 of Fig. 1;

Fig. 3 is a partial transverse sectional view taken through the lost-motion device associated with the cam means, as indicated by section line 3—3 of Fig. 1;

Fig. 4 is a development view showing the cam grooves;

Fig. 11 is a longitudinal section similar to Fig. 1 but showing a modified form of combined brake cylinder device and automatic slack adjuster;

Fig. 12 is a fragmentary longitudinal section corresponding with a portion of Fig. 11 and showing the releasable connection for one of the screw members on a larger scale and with the keys of the connection fully engaged in their keyways;

Fig. 13 is a fragmentary view, partly in longitudinal section, further illustrating such releasable connection and showing the keys partially withdrawn from the keyways.

Fig. 14 is a transverse section taken on the irregular section line 14—14 of Figs. 11 and 13;

Fig. 15 is a fragmentary longitudinal section corresponding with another portion of Fig. 11 and showing the cooperating screw members and associated parts on a larger scale;

Fig. 16 is a partial transverse section taken on line 16—16 of Figs. 11 and 15;

Fig. 17 is a partial transverse section taken on line 17—17 of Figs. 11 and 15;

Fig. 18 is a partial transverse section taken through the cooperating cam elements, as indicated by line 18—18 of Fig. 11;

Fig. 19 is a development view of the sleeve which carries the cam grooves;

Fig. 20 is a side elevation showing a connecting member and torsion spring assembly unit in detached relation; and Fig. 21 is an end view of the externally threaded screw member showing the location of the stop pin carried thereby.

Figure 7:
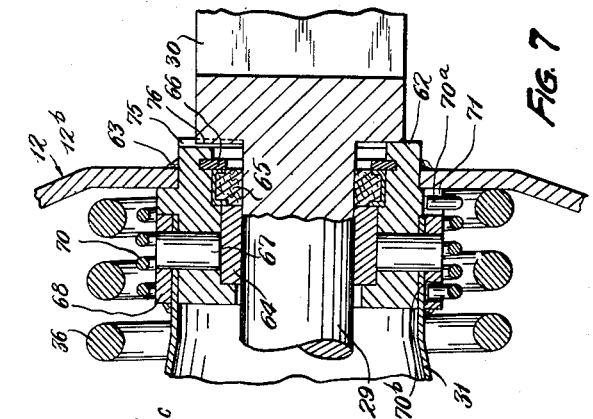
Fig. 7 is another such fragmentary longitudinal sectional view showing the lost-motion device on a larger scale.

In the two embodiments of the invention illustrated in the drawings an automatic slack adjusting mechanism is shown embodied in a brake cylinder device, and although the embodiment of a slack adjusting mechanism in a brake cylinder device constitutes one important feature of this invention, it should also be understood that the slack adjusting mechanism is considered to be novel in itself and adapted to various other applications. For example, the slack adjusting mechanism could be used in an installation in which it would be located externally of the brake cylinder device or could be located in a housing other than the housing of a brake cylinder device.

Proceeding first with a description of the embodiment of the invention illustrated in Figs. 1 to 10 inclusive, the drawings show an automatic slack adjusting mechanism 10 located in a brake cylinder device 11. The brake cylinder device 11 comprises a housing 12, which in this instance is formed of connected housing sections 12a and 12b, and a piston 13 reciprocably operable in the housing. The piston 13 is axially movable in the housing 12 and has an axial guide stem 14 which is telescopically received in a tubular extension 15 of the housing section 12a. The guide stem 14 is slidable in a bushing 16 which is mounted in the extension 15 and retained therein by the snap ring 16a.

The piston 13 cooperates with the housing section 12a in defining a chamber 17 to which pressure fluid, such as compressed air, can be supplied through the connection 18. The piston 13 can be slidable in the housing 12 but preferably, as here shown, the seal between the piston and housing is formed by a so-called "rolling" diaphragm 19 which is of a substantially sleeve-like form. This diaphragm can be made of any material suitable for this purpose, such as a rubberized fabric, and preferably has beads 19a and 19b extending therearound at its inner and outer ends. The diaphragm, or at least the bead 19a thereof, is preferably elastic in character.

The inner end of the diaphragm 19 is suitably attached to the piston 13 as by a clamping means or by having the bead 19a in an elastic gripping engagement with an inwardly offset shoulder 20 provided on the piston. Because of the elastic character of the diaphragm material, the bead 19a will contract tightly around the piston so as to cooperate with the annular shoulder 20 in forming a fluid-tight connection at this point. The outer end of the diaphragm is anchored on the housing 12 and is in fluid-tight engagement therewith by having the bead 19b clamped between the housing sections 12a and 12b. In addition to the sealing action produced by the elastic gripping of the shoulder 20 by the bead 19a, the intermediate portion of the diaphragm 19 will also be sealingly pressed against a substantial portion of the length of the skirt of the piston by the fluid pressure in the cylinder chamber 17. Since the rolling sleeve diaphragm 19 forms a seal in which there is no sliding or rubbing of the parts, no lubrication will be needed and an efficient operating condition will be maintained for a long period of trouble-free service.

The piston 13 may be of any suitable construction, for example and as here shown, the body 13a of the piston may be in the form of a drum shaped metal member having a substantially central opening 13b therein in which the inner end of the hollow guide stem 14 is secured by the welding indicated at 21. The piston may also include a flat ring-shaped member 22 which forms a thrust seat and whose inner face provides a plain or friction bearing surface 22a for a purpose hereinafter explained. The member 22 has its outer and inner edges connected respectively with the piston body 13a and the inner end of the guide stem 14 by the welds 23 and 24. To prevent the diaphragm 19 from being subjected to any torsional stresses the piston 13 is preferably held against rotation in the cylinder housing 12 as by means of the guide sleeve 13c which is connected with the piston and is slidable on a guide rod 12c carried by the housing.

The slack adjusting mechanism 10 is located in the chamber 25 of the brake cylinder housing 12 and which chamber is vented to atmosphere through one or more breather openings provided with suitable strainers 26. The slack adjusting mechanism comprises two cooperating relatively rotatable screw members 27 and 28 which are disposed in coaxial relation to each other and to the brake cylinder housing 12. A push rod 29 extending axially of the housing forms a part of the brake cylinder device 11 as well as a part of the slack adjusting mechanism 10. The inner end of the push rod 29 has the screw member 27 mounted thereon in the manner hereinafter explained and its outer end projects from the housing 12 and carries a clevis 30 which is adapted for connection with the brake rigging (not shown).

The slack adjusting mechanism 10 further includes a sleeve 31 extending in coaxial surrounding relation to the push rod 29 and having its inner end in telescoping relation to the adjacent end of the screw member 28. The outer end of the sleeve 31 is connected with the housing 12 by a lost-motion device 32 which will be further described hereinafter. As an important part thereof the slack adjusting mechanism 10 also includes sets of cooperating cam elements 33 and 34 carried respectively by the screw member 28 and the inner end of the sleeve 31 and which cam elements will also be further described hereinafter.

The screw member 28 is here shown in the form of a hollow rod having a right-hand internal thread 28a therein and also having a substantially radially projecting annular flange 35 thereon at an intermediate point of its length which seats against the friction bearing surface 22a of the thrust member 22 of the piston 13. The flange 35 is continuously held in seating engagement with the bearing surface 22a by a compression spring 36 which is disposed in surrounding coaxial relation to the push rod 29 and the sleeve 31. This spring is of sufficient strength to provide the necessary force for producing a return movement of the piston following an application of the brakes and to cause the brake-releasing movement to be transmitted through the rigging to the brake shoes. The right-hand end of the spring 36 is in seating engagement with the end wall of the housing section 12b and its other end engages a suitable spring seat such as the dished member 37 which cooperates with the flange 35 of the hollow rod 28.

The hollow rod 28 is, at times, referred to herein as an actuating member because of the manner in which it cooperates with the screw member 27 in imparting a slack take-up movement to the push rod 29 and is also at times referred to as the piston rod of the piston 13. The hollow rod 28 is not rigidly connected to the piston 13 but is connected therewith through the pressure relation with which the flange 35 is held against the friction bearing surface 22a of the thrust member 22 by the compression spring 36 and by the brake-applying force developed by the piston. It is important to note that the hollow rod or screw member 28 is rotatable relative to the piston 13 during the return stroke thereof for imparting the slack take-up movement to the screw member 27 and the push rod 29, as will be further explained hereinafter. The left-hand end of the hollow rod 28 extends through the head portion 13a of the piston and into the hollow guide stem 14 and is rotatably journalled in the latter by means of the axially spaced bushings 38 and 39.

It is desirable that the hollow rod 28 be relatively freely rotatable during the return stroke of the piston 13 and accordingly an anti-friction bearing member such as the flat annular bearing member 40 is provided between the radial flange 35 and the spring seat 37. It is also desirable that the hollow rod 28 be held against rotation during the brake-applying stroke of the piston 13 and this is accomplished by the action of the above-mentioned friction bearing surface 22a on the flange 35. The spring seat 37 is preferably held against rotation at all times and, for this purpose, is provided with an axial lug 41 which extends into an opening 42 in the thrust member 22 of the piston.

The screw member 27 has a right-hand external helical thread 27a thereon which cooperates with the internal thread 28a of the hollow rod 28. The screw member 27 is preferably in the form of a sleeve which is connected with the inner end of the push rod 29 by being mounted on a reduced stem extension or spindle portion 43 thereof. The end of the stem extension 43 is threaded and provided with a retaining nut 43a which retains the screw member 27 in adjacent relation to the shoulder 44 of the push rod without applying a clamping force which would prevent rotation of the screw member on the stem extension.

The engagement of the thread 27a of the screw member 27 with the internal thread 28a of the hollow rod 28 forms a thrust transmitting connection between these members by which axial movement is imparted directly to the push rod 29 during the brake-applying and brake-releasing functions. This engagement between the threads of the members 27 and 28 also forms a screw connection by which axial movement is imparted to the push rod 29 for taking up slack in the rigging in response to rotary movement imparted to the hollow rod 28 by cam means comprising the above-mentioned cam elements 33 and 34 and which cam means will be further described hereinafter.

A connection 45 is provided between the screw member 27 and the push rod 29 in the form of an automatically releasable connection which at times will permit this screw member to be rotated idly on the stem extension 43 of the push rod. This is desirable for preventing damage to the apparatus when the screw member 27 approaches or reaches the end of its slack take-up travel along the hollow rod 28 as represented by the stop or bushing 28b which is secured in the hollow rod as by means of the pin 28c. This automatically releasable connection 45 includes a pair of keys 46 which extend into a pair of keyways 47 provided in the push rod 29 adjacent the shoulder 44 thereof. The adjacent end of the screw member 27 is likewise provided with a pair of keyways 48 in which the keys 46 also engage. The keys 46 project from the keyways 48 of the screw member 27 into the keyways 47 of the push rod 29 for normally connecting this screw member with the push rod and the keys are held in this projected relation by a compression spring 49 disposed around the reduced portion 27b in which the keyways 48 are located.

The connection 45 also includes a sleeve 50 which is disposed in surrounding relation to the reduced portion 27a so as to form a housing for the spring 49 and the keys 46, and which also forms a stop as hereinafter explained. The left-hand end of the sleeve 50 is provided with an inturned annular flange or bead 51 forming a seat for the spring 49 and which flange is normally held against an annular shoulder 52 of the screw member 27 by the action of this spring. As shown in the drawings, the sleeve 50 is of a length such that its other end overlaps the push rod 29 and extends a short distance beyond the shoulder 44.

Figure 8:
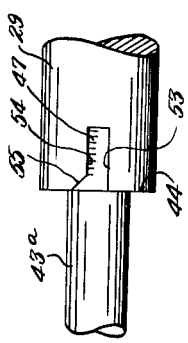
Fig. 8 is a fragmentary elevation showing a portion of the push rod which has certain keyways therein.
Figure 5:
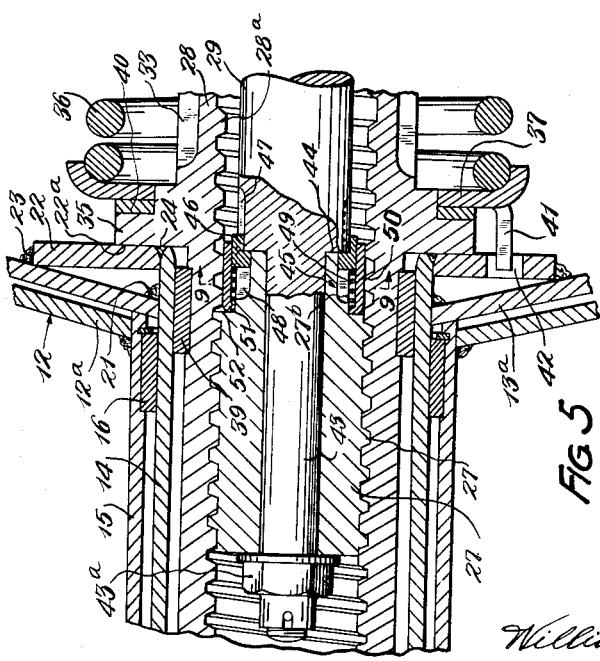
Fig. 5 is a fragmentary longitudinal sectional view corresponding with a portion of Fig. 1 and showing the cooperating screw members on a larger scale.
Figure 9:
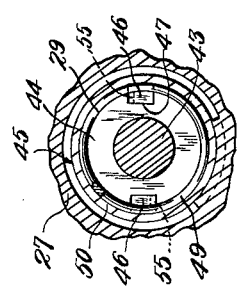
Fig. 9 is a partial transverse section further illustrating the keys and keyways of the push rod and taken substantially as indicated by section line 9—9 of Fig. 5.

The keyways 47 of the push rod 29 are of uniform width for the major portion of their length, as shown in Fig. 8, and have substantially flat parallel sides 53 and 54. The sides 53 form flat faces which extend for substantially the full length of these keyways whereas the side faces 54 at the opposite side of these keyways are provided at their outer end with a bevel 55 extending at an angle to the axis of the push rod, for example, an angle of about forty-five degrees. When the screw member 27 approaches or reaches the end of its slack take-up travel along the hollow rod 28, the inner ends of the keys 46 engage the bushing 28b and the keys are pushed outwardly of the keyways 47 until the bushing is engaged by the inner end of the thrust sleeve or stop 50. The inner ends of the keys 46 will then lie opposite the bevel faces 55 and thereafter any tendency for the hollow rod 28 to rotate the screw member 27 in a clockwise direction will cause the inner ends of the keys to engage these bevel faces and to be cammed outwardly thereby to fully disengage the keys from the keyways 47. Thus when the screw member 27 reaches the end of its slack take-up travel, the keys 46 and the bevel faces 50 become effective as a ratchet means which automatically disconnects the screw member 27 from the push rod 29 and permits this screw member to be rotated idly on the stem 43a.

As explained in greater detail hereinafter the push rod 29 is adapted to be manually rotated in a clockwise direction for resetting the slack adjusting mechanism 10 by returning the screw member 27 to its initial position after it has completed its slack take-up travel. Since the inner ends of the keys 46 normally remain partially engaged in the keyways 47 any such clockwise rotation of the push rod 29 will cause the straight side faces 53 of these keyways to cooperate with the keys and impart rotation to the screw member 27. As soon as the screw member 27 moves away from the bushing 28b the keys 46 will be fully engaged in the keyways 47 by the spring 49.

The cam means referred to above as comprising the sets of cooperating cam elements 33 and 34 serves to impart rotation to the hollow rod 28 during the return stroke of the piston 13 so as to cause the internal thread 28a to cooperate with the screw member 27 for imparting axial movement to the push rod 29 in a direction to extend the latter from the brake cylinder housing 12 and take up slack in the brake rigging. The cam elements 33 comprise relatively steep-pitch threads or cam grooves formed in the outer surface of the hollow rod 28 and the cam elements 34 comprise substantially radially inwardly extending pins which engage in these cam grooves and constitute cam followers.

The cam grooves 33 of the hollow rod 28 are further illustrated in the development view of Fig. 4 from which it will be seen that the hollow rod 28 is provided with two such grooves in substantially diametrically opposed relation and that each of these grooves comprises two substantially helically inclined groove portions 56 and 57 and a substantially axially extending straight groove portion 58. The inclination of the groove portion 57 is such that it converges toward the groove portion 56 and the adjacent ends of these groove portions are connected with each other by a substantially circumferentially extending transfer passage 59. The transfer passage 59 also serves to connect the end of the inclined groove portion 56 with the adjacent end of the straight groove portion 58.

The cam followers 34, as mentioned above, are in the form of pins which extend substantially radially inwardly from the sleeve 31 and engage in the cam grooves 33. The pins 34 can be mounted on the sleeve 31 by providing the latter with a ring-member 60 which is welded thereto and is disposed in surrounding relation to the hollow rod 28 and in which ring-member the pins are mounted by means of needle bearings 61. When mounted in this manner the pins 34 will be capable of rotation about their axes and will cooperate with the sides of the cam grooves 33 in the manner of rollers with a minimum amount of friction. As will be presently explained in greater detail, the pins 34 constitute reaction members which, when held by the sleeve 31 from revolving around the axis of the push rod 29, will produce rotation of the hollow rod 28 when the latter is moved axially relative to the sleeve 31.

The right-hand end of the sleeve 31 is connected with the end wall of the brake cylinder housing member 12b, as mentioned above, and this connection embodies the lost-motion device 32 which will be described next. The housing section 12b is provided at this point with a bearing member 62 through which the push rod 29 extends. The bearing member 62 may be connected with the housing section 12b by the welding 63 and is provided with a bushing 64 in which the push rod is slidable. A suitable packing or dirt seal 65 is provided in the bearing member 62 adjacent the outer end of the bushing 64 and in surrounding relation to the push rod 29. The packing 65 is retained in place as by means of the snap ring 66.

The bearing member 62 is provided with a pair of substantially radially disposed stop pins 67 which constitutes a part of the lost-motion device 32. These pins are mounted in fixed relation in the bearing member 62 but have their outer ends projecting radially therefrom. The right-hand end of the sleeve 31 extends in surrounding telescoping relation to the bearing member 62 and is journalled thereon for rotatably supporting this end of the sleeve in coaxial relation to the push rod 29. This end of the sleeve 31 can be reinforced as by means of a short tubular member 68 mounted thereon and welded thereto, as shown in Fig. 7. This journalled outer end portion of the sleeve 31 is provided with a pair of circumferentially extending slots 69 in which the outer ends of the stop pins 67 engage. The slots 69 cooperate with the pins 67 in forming the lost-motion connection 32 by which the sleeve 31 is permitted to have limited rotary movement around the push rod 29.

For controlling the cooperation between the cam elements 33 and 34, it is desirable that the sleeve 31 be rotated automatically in a counterclockwise direction (as seen in Fig. 3) after it has been initially rotated in a clockwise direction by the axial movement imparted to the hollow rod 28 by the piston 13 during the brake-applying movement of the latter. For this purpose a torsion spring 70 is disposed in surrounding relation to the bearing member 62 and the journalled end of the sleeve 31. This torsion spring has an inturned finger or hook 70a on one end thereof which engages in a slot 71 of the bearing member 62 for anchoring this end of the torsion spring on the bearing member. The opposite end of the spring 70 has a similar inturned finger or lug 70b which engages in a hole provided in the ring member 68 of the journalled end of the sleeve 31.

When clockwise rotation is imparted to the sleeve 31 by the hollow rod 28, as is permitted by the slots 69, the torsion spring 70 will be tensioned and when the sleeve 31 is subsequently released the force of the spring will rotate the sleeve in a counter-clockwise direction to take up the lost-motion afforded by the slots 69. The torsion spring 70 thus moves the ends 69a of the slots 69 into engagement with the stop pins 67 so that the pins thereafter hold the sleeve 31 against further counter-clockwise rotation and provide a solid connection between the sleeve and the brake cylinder housing against which the sleeve can react.

In the operation of the above described combined brake cylinder device and slack adjusting mechanism, pressure fluid is supplied to the brake cylinder chamber 17 through the connection 18 and acts on the piston 13 moving the latter toward the right as seen in Fig. 1. This movement of the piston is transmitted to the hollow rod 28 through the flange 35 thereof and, because of the threaded engagement between the screw members 27 and 28, the push rod 29 will also be moved toward the right. This right-hand axial movement of the push rod 29 is the brake-applying movement and causes a braking force to be supplied to the brake shoes through the rigging.

At the beginning of the brake-applying movement of the piston 13 the cam follower pins 34 are located adjacent the right-hand end of the cam groove portions 56, as indicated in Fig. 4. During this brake-applying movement of the piston 13 and the hollow rod 28, the side faces 56a of the cam groove portions 56 exert a wedging action on the pins 34 and cause the above-mentioned initial rotation to be imparted to the sleeve 31 in a clockwise direction as seen in Fig. 3. This clockwise rotation of the sleeve 31 causes the torsion spring 70 to be tensioned, as explained above. During this brake-applying movement it will be understood, of course, that the hollow rod 28 will be held against rotation by the frictional engagement provided between the flange 35 and the thrust member 22 of the piston. The axial movement of the hollow rod 28 toward the right by the piston 13 will cause the pins 34 to advance relatively along the groove portions 56 toward the transfer passages 59.

In some cases the brake-applying movement will be of such extent that the pins 34 will have an advance and return movement entirely within the length of the groove portions 56 and in those cases no relative rotation will be produced between the screw members 27 and 28 and no slack take-up action will result. This condition of operation is likely to occur when the brake shoes are new or relatively thick and there is little or no slack in the brake rigging. When the operating condition is such that the pins 34 operate entirely in the cam groove portions 56, as just described, the effect produced by the cooperating cam elements 33 and 34 is merely to cause rotation of the sleeve 31 within the limits permitted by the slots 69 of the lost-motion connection 32.

When the brake-applying operation is such that the axial movement of the hollow rod 28 is of sufficient length as to cause the cam follower pins 34 to advance as far as the transfer passages 59, the pins will travel over the points or control projections 72 of the cam grooves and will thereupon be released so as to permit the sleeve 31 to be rotated in a counter-clockwise direction (as seen in Fig. 3) by the torsion spring 70. The action of this spring will be to cause the pins 34 to be rapidly moved through the transfer passages 59 into engagement with the side faces 58a of the groove portions 58. If the brake-applying movement causes further axial movement of the hollow rod 28 toward the right, the pins 34 will simply advance further along the straight groove portions 58. If desired one of the control projections, for example the projection 72a, can be made longer than the other so that only this relatively longer projection will control the movement of the pins 34 through the transfer passages 59.

When the brakes are released, fluid pressure is exhausted from the brake cylinder chamber 17 permitting the compression spring 36 to impart a return movement to the piston 13 and a brake-releasing movement to the hollow rod 28 and the push rod 29. During this brake-releasing operation the movement of the hollow rod 28 toward the left causes the cam follower pins 34 to travel relatively in a return direction along the straight groove portions 58 toward the right as seen in Fig. 4, and to then enter the cam groove portions 57. During this return relative movement, the pins 34 exert a wedging action against the side faces 57a of the cam groove portions 57 to thereby impart a counter-clockwise rotation (as seen in Fig. 2) to the hollow rod 28. It will be understood that at this time the sleeve 31 is held against rotation by the stop pins 67 of the lost-motion connection 32 and the sides 57a of the inclined cam groove portions 57 reacting against the then stationary cam follower pins 34 cause such counter-clockwise rotation of the hollow rod 28. This counter-clockwise rotation of the hollow rod 28 causes the internal thread 28a thereof to advance the screw member 27 toward the right thereby shifting the push rod 29 in an outward axial direction for taking up slack in the brake rigging. At the end of the return stroke of the piston 13 the cam follower pins 34 will occupy their initial relative position shown in Fig. 4 and the mechanism will be ready for another such cycle the next time that the brake cylinder device 11 is operated to apply and release the brakes.

The range of operation for the mechanism 10 in taking up slack in the brake rigging corresponds with the effective length of the internally threaded portion of the hollow rod 28. When the functioning of the slack adjusting mechanism 10 has taken place to the extent of causing the screw member 27 to be advanced along the hollow rod 28 to the inner end thereof, the connection 45 between the screw member 27 and the push rod 29 is automatically released, as explained above, to prevent damage to the apparatus. The above-described releasable connection formed between the screw member 27 and the push rod 29 by the key and keyway elements 46 and 47 accomplishes this purpose. Thus when the slack-adjusting relative rotary movement between the screw members 27 and 28 advances the member 27 to the bushing 28b this bushing is engaged by the inner ends of the keys 46 and shifts these keys in an axial direction to the position in which their inner ends cooperate with the beveled portions 55 to form a ratchet, as previously explained herein. The screw member 27 is then free to rotate idly with the hollow rod 28 and relative to the push rod 29 so that no further slack adjusting movement will be imparted to the push rod.

When all of the slack adjusting travel between the screw members 27 and 28 has been utilized, the slack adjusting mechanism 10 remains in the condition with the screw member 27 located adjacent the bushing 28b and with the cooperating key and keyway elements 46 and 47 producing the above described ratchet action which permits rotation of the hollow rod 28 by the cam means without imparting further axial slack adjusting movement to the push rod 29. When the mechanism is in this condition it should be manually reset and, in accordance with another of the features of this invention, the apparatus is designed to permit such manual resetting. To reset the apparatus the brake rigging is disconnected from the clevis 30 and the push rod 29 is rotated in a clockwise direction by applying a rotative force to the clevis.

The clockwise rotation of the push rod 29 causes the flat side faces 53 of the keyways 47 to cooperate with the end portions of the keys 46 and impart an initial clockwise rotation to the screw member 27. The spring 49 thereupon reengages the keys for their full extent in the keyways, as mentioned above, to thereby reestablish the normal drive connection between the push rod and the screw member 27. Further clockwise rotation of the push rod 29 will cause the screw member 27 to advance toward the left in the hollow rod 28 thereby retracting the push rod into the brake cylinder 12 to substantially the position in which it is shown in Fig. 1. The apparatus will then be ready for further slack-adjusting service and the brake rigging is thereupon reconnected to the clevis 30.

During the resetting of the slack-adjusting mechanism 10, as just described, it is desirable to prevent the screw member 27 from exerting a pulling force on the hollow rod 28 such as might cause compression of the spring 36 and shifting of the piston 13 part way along its working travel. For this purpose an interlock is provided between the clevis 30 and the brake cylinder 12 and which becomes effective when the screw member 27 has been fully returned to its initial position. In this instance the interlock comprises a pair of stop shoulders or teeth 75 on the outer end of the bearing member 62 and a second pair of such shoulders or teeth 76 on the clevis 30. When the clockwise resetting rotation of the push rod 29 has retracted the push rod into the brake cylinder to the point where the teeth 76 of the clevis engage the teeth 75 of the bearing member 62, further rotation of the push rod will be prevented by the interlock and the screw members 27 and 28 will be prevented from loading the spring 36 and imparting an initial travel to the piston 13.

Figs. 11 to 20 inclusive, illustrate a modified form of combined automatic slack adjuster and brake cylinder device 80 which will now be described and which embodies the same general features and principles as the above described device 10 of Figs. 1 to 10 inclusive. The modified apparatus comprises in general, a brake cylinder device 81 consisting of a housing 82 and a piston 83 operable therein and an automatic slack adjusting mechanism 84 which is located in such housing. The brake cylinder device 81 also includes a push rod 85 having one end thereof projecting from the housing 82 and carrying a clevis 86 by which it is adapted to be connected with a brake rigging. Additionally, the brake cylinder device includes a compression spring 87 which is located in the housing in surrounding coaxial relation to the push rod 85 and which causes the return stroke of the piston and push rod during the releasing of the brakes.

The housing 82 of the brake cylinder device 81 can be of a sectional construction similar to that of the housing 12 already described above and has a fluid pressure chamber or cylinder 88 therein in which the piston 83 is operable. The housing 82 is provided at one end thereof with a fixed hollow bearing member 89 carrying a bushing 89a in which the push rod is slidable and through which one end of the push rod projects for connection with the brake rigging. An axial sleeve 90 extends into the housing 82 in surrounding relation to the push rod 85 and is connected in fixed relation to the housing by having its outer end attached to the bearing member 89 as by means of the welding indicated at 91. At its opposite end the housing 82 is provided with a hollow axial guide projection 92 having a bushing 93 mounted therein.

The piston 83 is provided with head and skirt portions 83a and 83b and is movable through a brake applying stroke by pressure fluid, such as compressed air, supplied to the chamber 87 through the connection 93. A rolling sleeve diaphragm 95 having one end anchored on the housing 82 and its other end mounted on the piston 83 forms a seal between the piston and housing. The piston 83 is provided on one side thereof with an axially extending hollow guide stem 97 which extends into the hollow guide projection 92 of the housing and is slidable in the bushing 93. On its other side the piston is provided with another axially extending hollow guide stem 98, the outer end of which extends into telescoping relation with the fixed sleeve 90 of the housing. A bushing 99 carried by the inner end of the fixed sleeve 90 is slidably engaged by the hollow guide stem 98, the bushing being mounted on the outside of the fixed sleeve and the guide stem extending in telescoping relation around the bushing and sleeve. With the construction just described, it will be seen that the piston 83 is supported and guided in the housing 82 by the slidable engagement of the guide stems 97 and 98 with the bushings 93 and 99. It will be observed also that the guide stems 97 and 98 form a piston rod for the piston and provide a passage or chamber which extends axially through the head of the piston.

The slack adjusting mechanism 84 forms an operative connection between the piston 83 and the push rod 85 and includes a pair of cooperating screw members 101 and 102. The screw member 101 is an internally threaded hollow member carried by the piston 83 and located in surrounding coaxial relation to the push rod 85. The screw member 102 is an externally threaded member mounted on the push rod 85 and which engages in and extends through the internally threaded screw member 101. These screw members 101 and 102 cooperate in forming a direct thrust transmitting connection between the piston 83 and the push rod 85 by which brake applying movement can be transmitted to the latter during a working stroke of the piston. These screw members also provide a connection between the piston and push rod such that when one of the screw members, in this instance the member 101, is rotated in a clockwise direction, as seen in Fig. 17, outward axial movement will be imparted to the push rod 85 for taking up slack in the brake rigging.

For the accomplishment of the slack take-up action just explained, the screw member 101 is rotatable relative to the piston 83 and relative to the screw member 102. The screw member 101 is mounted on the piston 83 by means of an outer bearing race 103 which is located in the guide stem 98 and an annular row of anti-friction bearing elements 104 by which this screw member is supported in this outer race. The connection between the rotatable screw member 101 and the piston 83 also includes a substantially spherical thrust seat 105 carried by the piston and an end thrust face 106 engaging the same and carried by the screw member. The thrust seat 105 can be formed directly on the piston 83 or on a ring member 105a, as shown in this instance, and which ring member is incorporated in the piston by being welded to the guide stems 97 and 98.

By mounting the screw member 101 on the piston 83 in the manner just explained, it will be seen that during a working stroke of the piston the thrust will be transmitted to the push rod 85 directly through the thrust surfaces 105 and 106, and since these surfaces are only plain bearing surfaces, there will be some friction therebetween which will tend to hold the screw member 101 against rotation during such working stroke. The return stroke of the piston is produced by the compression spring 87 and during this return stroke the thrust of the spring is transmitted to the piston through the anti-friction bearing elements 104. Since the bearing load at this time is substantially removed from the thrust surfaces 105 and 106 and there will be very little friction between the screw member 101 and the bearing elements 104, this screw member will be free to rotate relative to the piston during the return stroke of the latter.

The screw member 102 is here shown in the form of a relatively long sleeve which is mounted on a reduced stem or spindle portion 107 of the push rod 85. At the base of the stem portion 107, the push rod is provided with a shoulder 108 against which one end of the screw member 102 engages for transmitting thrust to the push rod. At the other end of the screw member 102 a releasable connection, indicated generally by the reference character 109, is provided between this screw member and the end of the reduced stem portion 107 of the push rod. This releasable connection serves to connect the screw member 102 with the push rod and when the screw member 102 has substantially traversed its permissible travel in the screw member 101, this connection releases the screw member 102 so that it can rotate idly relative to the push rod. The screw member 102 will then impart no further axial movement to the push rod until the mechanism has been manually reset. This releasable connection therefore prevents damage to the slack adjusting mechanism 84 when this mechanism has operated to take up slack to the extent of its full operating capacity.

The releasable connection 109 is formed by a pin 111 which extends through the stem 107 adjacent the end thereof and a collar 112 which is axially shiftable on the stem 107 and carries a pair of substantially diametrically opposed axially extending arcuate keys 113. The end of the screw member 102 is provided with a pair of diametrically opposed keyways 114 into which the keys 113 extend, as shown in Fig. 13. The collar 112 includes a sleeve portion 112a which is slidable on the stem 107 and a radial flange or disk portion 112b on which the keys 113 are formed or mounted. The sleeve portion 112a of the collar 112 has a pair of axially extending slots 115 therein which cooperate with the pin 111 so as to permit axial shifting of the collar but with the collar held at all times against rotation on the stem 107.

A coil spring 116 of substantially conical shape has its large end seated on the flange 112b of the collar 112 and this spring acts to continuously urge the collar toward the right, as seen in Figs. 12 and 13, to engage the keys 113 in the keyways 114. The small end of the spring 116 seats against the pin 111 and engages the rabbeted or undercut ends 111a thereof for retaining this pin in the opening 111b of the stem 107. The releasable connection 109 also includes a pin 117 which is mounted in fixed relation in the end of the screw member 102 so as to project part-way into the thread groove, as shown in Figs. 14 and 21, and form a stop which will engage the end convolution of the thread of the screw member 101 when the screw member 102 has traversed its slack adjusting travel.

As shown in Figs. 13 and 14 the keys 113 are each provided with a flat face 113a on one side thereof and an inclined face or bevel 113b on the other side thereof. The keyways 114 are provided with flat side faces 114a on both sides thereof and the flat faces at one side of the keyways are normally engaged by the flat side faces 113a of the keys. During the slack adjusting action of the mechanism 84, the screw member 102 moves relatively through the screw member 101 and toward the right as seen in Fig. 11, and when the screw member 102 reaches the end of its permissible travel the stop pin 117 will engage the end convolution of the thread of the screw member 101, as mentioned above. Just prior to this engagement, the flange 112b of the collar 112 will engage the end face 101a of the screw member 101 and the continued movement of the screw member 102 to the right to engage the stop pin 117 with the end convolution of the screw member 101 causes the collar 112 to be shifted to the left relative to the stem 107 to thereby cause the keys 113 to be partially withdrawn from the keyways 114 as shown in Fig. 13. The complete withdrawal of the keys from the keyways is prevented by the engagement of the stop pin 117 with the end convolution of the screw member 101.

The partial withdrawal of the keys 113 from the keyways 114 brings the inclined faces 113b of the keys to a position opposite the outer ends of the keyways and the tendency for the screw member 102 to be rotated by the screw member 101 will cause these inclined faces to act as cams or ratchet teeth and impart further outward axial movement to the collar 112, resulting in complete disengagement of the keys from the keyways. This permits the screw member 102 to turn with the screw member 101 and rotate idly on the stem 107 during which time the keys cooperate with the keyways in the manner of a ratchet and no further slack adjusting axial movement will be imparted to the push rod 85. When the push rod 85 is rotated in a clockwise direction by a manual force applied to the clevis 86 for the purpose of resetting the slack adjusting mechanism, the collar 112 will be driven by the pin 111 and the partial engagement of the keys 113 in the keyways 114 will enable the push rod to impart an initial return movement to the screw member 102. This initial return movement of the screw member 102 moves the collar 112 away from the screw member 101 thereby permitting the keys to be urged into full engagement with the keyways by the spring 116.

The portion of the slack adjusting mechanism 84 which serves to rotate the screw member 101 for producing the slack take-up action will be described next. The means for rotating this screw member comprises sets of cooperating cam elements 119 and 120 of which the cam elements 119 are carried by the fixed sleeve 90 of the brake cylinder housing 82 and the cam elements 120 are carried by a sleeve extension 121 of the screw member 101. The cam elements 119 can be referred to as the cam followers and comprise rollers 122 mounted on pins 123 which are carried by the fixed sleeve 90. The rollers 122 can be formed by small anti-friction bearings mounted on the pins 123 so that the outer races of these bearing form the rollers. The pins 123 can be riveted or otherwise fixed in the sleeve 90 and, if desired, can be extended outwardly of the sleeve and partway through the bushing 99 for holding the latter in place.

The cam elements 120 are in the form of cam grooves formed in or provided on the extension sleeve 121 of the screw member 101. In this instance these cam grooves are provided by mounting a pair of preformed cam segments 125 and 126 on the sleeve 121 as by means of brazing or welding. The cam grooves 120 have thrust faces 127 at one side thereof which are inclined at a relatively small angle to the axis of the push rod and are formed by the edges of the cam segments 125 and 126. The cam grooves are provided at the other side thereof with thrust faces 128 which are inclined relative to the axis of the push rod at a much greater angle, such as an angle of about forty-five degrees, and are formed by the opposite edges of the cam segments 125 and 126. As shown in Fig. 19, the cam segments 125 and 126 are relatively wide at the right hand end thereof and converge to relatively narrow finger-like portions 129 and 130 at their left ends. As also shown in Fig. 19, the cam grooves 124 communicate with each other to the left of the fingers 129 and 130 so that the cam followers 119 can shift from one cam groove to the other by passing over these finger portions, as will be explained hereinafter.

The sleeve extension 121 which carries the cam elements 120 can be formed as an integral portion of the screw member 101 but preferably, as here shown, is a separate member which is connected with the screw member by a lost-motion connecting means 131 which will now be described. This lost-motion connection is formed by a pair of radial pins 132 carried by the screw member 101 and a pair of slots 133 in the sleeve member 121 into which these pins extend, as shown in Fig. 15. The slots 133 of the sleeve 121 can be reinforced by quadrangular eyelets or ring members 134 mounted on the sleeve member in surrounding relation to the slots as shown in Fig. 19. These cooperating pin and slot elements 132 and 133 permit limited relative rotary movement between the screw member 101 and its sleeve extension 121.

This lost-motion connection 131 also includes a combined torsion and compression spring 135 which is carried by a locking sleeve 136. The torsion spring and locking sleeve form an assembly unit, as shown in Fig. 20, which is adapted to be introduced into the extension sleeve 121 by a suitable tool and engaged with the inner ends of the pins 132 for holding the latter in place. For such holding engagement with the pins 132, the locking sleeve 136 is provided with bayonet slots 137 which cooperate with annular grooves 138 formed in the pins adjacent their inner ends. The torsion spring 135 has one end thereof anchored on the locking sleeve 136 by means of the axially extending finger 135a of the spring engaging in a hole provided in the radial flange 136a of this sleeve. The torsion spring is provided at its other end with an outwardly projecting finger 135b which engages in a hole of the extension sleeve 121 when the locking sleeve assembly unit has been assembled in place, as shown in Fig. 15.

In assembling the locking sleeve 136 into the position shown in Fig. 15, the torsion spring 135 is subjected to an initial compression in an axial direction and to an initial torsional stress, and when the locking sleeve has been assembled in place the spring is maintained in this initially stressed condition. As will be explained hereinafter, the torsion spring 135 is adapted to be subjected to further torsional stress during rotation of the sleeve 121 in one direction and this torsional stress subsequently rotates the sleeve in the opposite direction to shift the cam follower elements 119 from one side to the other of the finger portions 129 and 130 of the cam segments 125 and 126.

As mentioned above, the compression spring 87 causes the return movement of the piston 83 and also causes the push rod 85 to transmit brake releasing movement to the brake rigging. This compression spring also causes the slack adjusting mechanism 84 to accomplish its slack take-up action, as will be presently explained. One end of the spring 87 seats against an end wall of the cylinder housing 82 and its other end engages a spring seat 140 carried by the hollow guide stem 98. The spring seat 140 is detachably connected with the guide stem 98 by means of a group of circumferentially spaced balls 141 which also serve to transmit the thrust of the spring 87 directly to the outer bearing race 103 in which the screw member 101 is mounted. The balls 141 are located in and extend part way through openings 142 of the guide stem 98.

The spring seat 140 includes an axially extending sleeve 143 having circumferentially spaced flared portions 144 forming tapered grooves 145 in which the balls 141 are located. The thrust of the spring 87 on the spring seat 140 is in a direction to cause the flared portions 144 to cam the balls 141 inwardly into engagement with the bearing race 103. When the parts are in their assembled relation, as shown in Fig. 15, the balls 141 are prefertbly spaced slightly from the edges of the openings 142 so that the thrust of the spring 87 will be transmitted to the race 103 rather than to the guide stem 98. The openings 142 are somewhat smaller in diameter than the balls 141 so that these balls will be prevented from passing entirely through the wall of the guide stem 98 when the parts are disassembled. The balls 141 are prevented by the spring seat 140 from dropping out of the openings 142 and disengagement of the balls from the grooves 145 is prevented by cotter pins 146 extending across the latter.

Although the operation of the modified brake cylinder device and slack adjuster 80 has already been partially explained herein, it will now be summarized in the following paragraphs. When an application of the brakes is made, pressure fluid is supplied to the cylinder chamber 88 causing movement of the piston 83 toward the right which results in brake applying thrust being transmitted through the cooperating screw members 101 and 102 to the push rod 85 and thence to the brake rigging through the clevis 86. During this working stroke of the piston, the spring 87 is compressed and the sleeve extension 121 of the screw member 101 is moved axially relative to the fixed sleeve 90. During this movement of the sleeve member 121, the cam faces 127 of the cam grooves 120 act on the cam followers 119 but since the latter are held stationary by the sleeve 90 the resulting reaction produces rotation of the sleeve member 121 in a counterclockwise direction as seen in Fig 18.

This initial rotation of the sleeve member 121 is only a limited movement which is permitted by the slots 133 of the lost-motion connection 131 and serves to tension the torsion spring 135. If the working stroke of the piston is of insufficient length to cause the fingers 129 and 130 of the cam segments 125 and 126 to move past the cam followers 119, no slack adjusting action will take place and the torsion spring 135 will merely be alternately tensioned and relieved by an idle back and forth limited rotation of the sleeve member 121. If the wear which has taken place on the brake shoes or if the slack existing in the rigging is such that the working travel of the piston 83 is of a length to cause the fingers 129 and 130 to move past the cam followers 119, the torsion spring 135 will then rotate the sleeve member 121 in a clockwise direction to shift the cam segments 125 and 126 through an arcuate distance sufficient to cause the cam faces 128 to be presented to the cam followers.

During the release of the brakes, the pressure is exhausted from the cylinder 88 to permit the spring 87 to cause a return movement of the piston 83. This action of the spring also causes movement of the screw member 101 and its extension sleeve 121 toward the left. This movement of the sleeve member 121 pulls the cam faces 128 against the followers 119 and since the latter are held stationary by the sleeve 90, a reaction will result which will cause rotation of the sleeve member 121 in a clockwise direction, as seen in Fig. 18. This rotation of the sleeve member 121 will act through the pins 132 to cause a similar rotation of the screw member 101 and this in turn, will act on the screw member 102 to produce an outward movement of the push rod 85 toward the right, as seen in Fig. 11, for taking up slack in the brake rigging.

When the screw member 102 has substantially traversed the screw member 101 so as to bring the flange 112b of the collar 112 into engagement with the end face 101a of the screw member 101, the connection 109 with the push rod will be released, as explained above, and the screw member 102 will then be free to rotate with the screw member 101 and no further slack adjusting action will be produced. When this condition occurs the slack adjusting mechanism 84 should be reset and the manner in which this is done will be explained next.

To reset the slack adjusting mechanism 84 the brake rigging is disconnected from the clevis 86 and the latter is rotated manually in a clockwise direction. The initial clockwise rotation of the push rod will cause the connection 109 to be reestablished and the continued rotation of the push rod will cause the screw member 102 to be screwed through the screw member 101 to its initial position in which it extends into the hollow guide stem 97 of the piston 83, as shown in Fig. 11. The apparatus is then ready for further slack adjusting action and the brake rigging is reconnected to the clevis 86.

Figure 10:
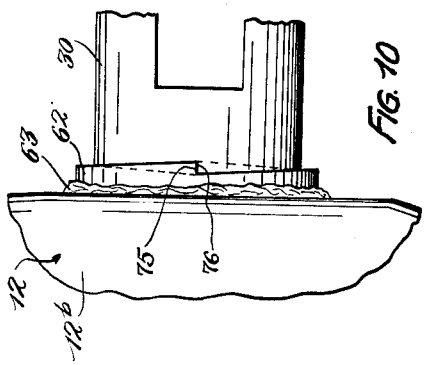
Fig. 10 is a fragmentary elevation view showing an interlock provided between the brake cylinder and the push rod.
Figure 6:
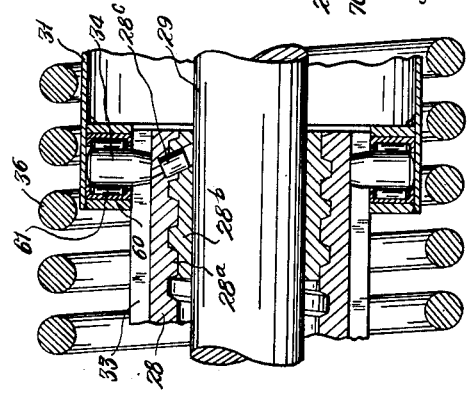
Fig. 6 is another fragmentary longitudinal sectional view corresponding with a portion of Fig. 1 and showing the cam elements on a larger scale.

To prevent the resetting operation just explained above from being carried too far and causing an initial movement of the piston 83, the brake cylinder housing 82 and the clevis 86 are provided with the interlock elements 75 and 76 which are illustrated on a larger scale in Fig. 10 and have been described above. When these elements come into engagement they interrupt the manual rotation of the push rod 85. The elements 75 and 76 also accomplish another important function in the mechanisms of Figs. 1 and 11 in that they provide a stop for limiting the return travel of the piston 83 during the brake releasing action. The provision of the stop formed by the elements 75 and 76 thus causes the spring 87 to be confined so that the end section of the brake cylinder housing 82 can be removed for inspection or replacement of the rolling sleeve diaphragm 95.

From the foregoing description and the accompanying drawings it will now be readily understood that this invention provides an improved slack adjusting mechanism which is relatively simple and can be easily manufactured and assembled. It will also be seen that this invention provides a combined brake cylinder device and slack adjusting mechanism in which the latter mechanism is housed and protected in the brake cylinder device. Additionally, it will be seen that when the predetermined relative travel for taking up the slack in the brake rigging has taken place, the take-up mechanism will be automatically rendered ineffective so as to prevent damage to the apparatus. It will be seen further that the slack adjusting mechanism provided by this invention is adapted to be reset by manual adjustment and that this manual adjustment can be readily accomplished from the exterior of the brake cylinder device.

Although the automatic slack adjusting mechanism, and the combined brake cylinder device and automatic slack adjuster of this invention have been illustrated and described herein to a somewhat detailed extent, it will be understood, of course, that the invention is not to be regarded as being limited correspondingly in scope but includes all changes and modifications coming within the terms of the claims hereof.

Having thus described my invention, I claim:

1. In a slack adjuster of the character described, a housing, actuating means movable axially in said housing, a push rod projecting from said housing, means connecting said push rod with said actuating means for actuation thereby including a screw member carried by the actuating means and adapted to be rotated for causing axial movement of said push rod relative to said actuating means and in a direction to take up slack, a sleeve connected with said housing and extending in coaxial relation to said screw member, cooperating cam elements connected with said sleeve and screw member for imparting rotary movement to the latter in response to operation of said actuating means in said housing, and lost-motion means effective to control the cooperation between said cam elements and embodying a torsion spring, said torsion spring being adapted to be stressed in response to initial rotary movement of said screw member for rendering said lost-motion means effective.

2. In a slack adjuster, a housing, an actuating member in said housing and adapted for rotary and axial movement, a thrust member projecting from said housing, a screw thread connection between said members and adapted to cause axial movement of said thrust member for taking up slack in response to rotary movement of said actuating member, a sleeve in said housing and extending in substantially coaxial relation to said members, cooperating cam elements connected with said actuating member and sleeve and adapted to impart rotary movement to said actuating member in response to axial movement thereof, one of said cam elements being a follower and the other being a helical cam groove in which said follower engages, means connecting said sleeve with said housing so as to permit limited rotary movement of the sleeve, said cam groove comprising one portion adapted to cooperate with said follower to cause said limited rotary movement of said sleeve and another portion adapted to cooperate with said follower to cause said rotary movement of said actuating member, and a torsion spring adapted to be tensioned by rotary movement of said sleeve in one direction and being effective to rotate said sleeve in the opposite direction for shifting the engagement for said follower from said one portion of said cam groove to said other portion.

3. In a slack adjuster, a housing, a hollow actuating rod in said housing and adapted for rotary and axial movement, a push rod in said actuating rod and projecting from said housing, a screw thread connection between said rods and adapted to cause axial movement of said push rod for taking up slack in response to rotary movement of said actuating rod, a sleeve in said housing and extending in substantially coaxial relation to said rods, a helical cam element on said actuating rod, a follower carried by said sleeve and engaging said element, means forming a lost-motion connection between said sleeve and housing which permits a limited rotary movement of the sleeve, said cam element having one portion adapted to cooperate with said follower for causing rotary movement of said sleeve in one direction and another portion adapted to cooperate with said follower for causing rotation of said actuating rod, and a torsion spring adapted to be tensioned by the rotary movement of said sleeve, said spring being effective when tensioned to shift said follower from engagement with said one portion of said cam element to engagement with said other portion.

4. In a slack adjusting mechanism for brakes, an actuating means adapted for rotary and axial movement and having a threaded portion, a push rod, a screw member on said push rod and engaging said threaded portion so that axial movement of said actuating means imparts axial movement to said push rod for actuating the brakes and rotary movement of said actuating means imparts axial movement to said push rod for taking up slack, and means connecting said screw member with said push rod so as to be held against rotation by the latter during normal operation of the mechanism, said connecting means being releasable to permit rotation of said screw member relative to said push rod when the screw member has substantially traversed said threaded portion.

5. In a slack adjusting mechanism for brakes, an actuating means adapted for rotary and axial movement and having a threaded portion, a push rod, a screw member on said push rod and engaging said threaded portion so that axial movement of said actuating means imparts axial movement to said push rod for actuating the brakes and rotary movement of said actuating means imparts axial movement to said push rod for taking up slack, and cooperating key and keyway means connecting said screw member with said push rod so as to be held against rotation by the latter during normal operation of the mechanism, said key means being disengageable from said keyway means to release said screw member for rotation relative to said push rod, and means adapted to cause disengagement of said key means when said screw member has substantially traversed said threaded portion.

6. In a slack adjusting mechanism for brakes, an actuating means adapted for rotary and axial movement and having a threaded portion, a push rod, a screw member on said push rod and engaging said threaded portion so that axial movement of said actuating means imparts axial movement to said push rod for actuating the brakes and rotary movement of said actuating means imparts axial movement to said push rod for taking up slack, means forming a releasable holding connection between said screw member and said push rod by which said screw member is held against rotation by said push rod during the normal operation of said mechanism, means adapted to cause the release of said holding connection when said screw member has substantially traversed said threaded portion, and means effective to reestablish said releasable holding connection.

7. In a slack adjusting mechanism for brakes, an actuating means adapted for rotary and axial movement and having a threaded portion, a push rod, a screw member on said push rod and engaging said threaded portion so that axial movement of said actuating means imparts axial movement to said push rod for actuating the brakes and rotary movement of said actuating means imparts axial movement to said push rod for taking up slack, means forming a releasable holding and driving connection between said screw member and said push rod by which said screw member is held against rotation by said push rod during the normal operation of the mechanism and by which said screw member is adapted to be rotatably driven by the push rod during manual rotation of the latter, means adapted to cause the release of said connection when said screw member has substantially traversed said threaded portion, said screw member having a return travel relative to said push rod in response to the manual rotation of the latter, and means effective to reestablish said releasable holding and driving connection in response to the manual rotation of said push rod.

8. In a slack adjusting mechanism for brakes, a housing, an actuating means adapted for rotary and axial movement in said housing and having a threaded portion, a push rod projecting from said housing, a screw member on said push rod and engaging said threaded portion so that axial movement of said actuating means imparts axial movement to said push rod for actuating the brakes and rotary movement of said actuating means imparts axial movement to said push rod for taking up slack, means forming a releasable holding and driving connection between said screw member and said push rod by which said screw member is held against rotation by said push rod during the normal operation of the mechanism and by which said screw member is adapted to be rotatably driven by the push rod during manual rotation of the latter, means adapted to cause the release of said connection when said screw member has substantially traversed said threaded portion, said screw member having a return travel relative to said push rod in response to the manual rotation of the latter, means effective to reestablish said releasable holding and driving connection in response to the manual rotation of said push rod, and rotary stop means effective between said push rod and housing and adapted to limit the return relative travel of said screw member by arresting the manual rotation of said push rod.

9. In a slack adjuster for brakes, a housing having a hollow axial guide projection at one end and a hollow bearing member at its other end, actuating means axially movable in said housing and having a hollow guide stem slidable in said guide projection, an internally threaded first screw member movable axially of said housing with said actuating means and being rotatable in said hollow guide stem, a push rod having one end extending into said first screw member and its other end projecting from said housing through said hollow bearing member, an externally threaded second screw member journaled on said one end of said push rod and engaging in said first screw member to form an operating connection between said actuating means and said push rod adapted to transmit axial movement to the latter, said operating connection being effective in response to relative rotary movement between said screw members for imparting axial movement to said push rod in a direction to take up slack, a sleeve having one end thereof in telescoping relation to said first screw member and its other end mounted on said hollow bearing member for limited rotary movement, cooperating cam and cam follower elements adapted to cause said relative rotary movement between said screw members in response to the axial movement of said actuating member in one direction, one of said elements being carried by said sleeve and the other being carried by said first screw member, means forming a releasable holding connection adapted to hold said second screw member against rotation relative to said push rod during the normal operation of the slack adjuster, and means adapted to cause the release of said holding connection to permit rotation of said second screw member relative to said push rod when said second screw member has traversed said first screw member.

10. In a slack adjuster for brakes, a housing having a hollow axial guide projection at one end and a hollow bearing member at its other end, actuating means axially movable in said housing and having a hollow guide stem slidable in said guide projection, an internally threaded first screw member movable axially of said housing with said actuating means and being rotatable in said hollow guide stem, a push rod having one end extending into said first screw member and its other end projecting from said housing through said hollow bearing member, an externally threaded second screw member connected with said one end of the push rod and engaging in said first screw member to form an operating connection between said actuating means and said push rod adapted to transmit axial movement to the latter, said operating connection being effective in response to relative rotary movement between said screw members for imparting axial movement to said push rod in a direction to take up slack, a sleeve having one end thereof in telescoping relation to said first screw member and its other end mounted on said hollow bearing member for rotary movement, means forming a lost-motion connection between said sleeve and said hollow bearing member including a torsion spring adapted to be tensioned by rotary movement of said sleeve in one direction and to subsequently impart rotary movement to the sleeve in the opposite direction, and cooperating cam and cam follower elements adapted to cause said relative rotary movement between said screw members in response to the axial movement of said actuating member in one direction, one of said elements being carried by said sleeve and the other being carried by said first screw member.

11. In a slack adjuster, a housing, a push rod extending axially of said housing and projecting therefrom, actuating means movable in said housing in the direction of the axis of said push rod and including an internally threaded first screw member which is rotatable about said axis, an externally threaded second screw member carried by said push rod and engaging said first screw member such that rotation of said first screw member will impart axial movement to said push rod for taking up slack, a pair of sleeves in said housing extending in coaxial relation around said push rod and having their adjacent ends in telescoping relation, one of said sleeves having fixed connection with said housing and the other being connected with said first screw member, and cooperating cam and cam follower elements carried by said sleeves and adapted to cause rotation of said first screw member in response to axial movements of said actuating means in one direction.

12. In a slack adjuster, a housing, a push rod extending axially of said housing and having one end projecting therefrom, said push rod having a spindle portion at its other end, actuating means movable in the direction of the axis of said push rod and including an internally threaded first screw member which is rotatable about said axis, an externally threaded second screw member carried by the spindle portion of said push rod and engaging said first screw member such that rotation of said first screw member will impart axial movement to said push rod for taking up slack, a pair of sleeves extending in coaxial relation around said push rod and having their adjacent ends in telescoping relation, means connecting one of said sleeves with said housing in fixed relation, lost-motion means connecting the other of said sleeves with said first screw member, cooperating cam and cam follower elements carried by said sleeves and adapted to cause rotation of said first screw member in response to axial movement of said actuating means in one direction, means forming a releasable holding connection adapted to hold said second screw member against rotation relative to said push rod during the normal operation of the slack adjuster, and means adapted to cause the release of said holding connection to permit rotation of said second screw member on said spindle portion when one of said screw members has been traversed by the other.

13. In a slack adjuster, a housing, a push rod extending axially of said housing and projecting therefrom, actuating means movable in said housing in the direction of the axis of said push rod and including an internally threaded first screw member which is rotatable about said axis, an externally threaded second screw member carried by said push rod and engaging said first screw member such that rotation of said first screw member will impart axial movement to said push rod for taking up slack, a pair of sleeves extending in coaxial relation around said push rod and having their adjacent ends in telescoping relation, means connecting one of said sleeves with said housing in fixed relation, lost-motion means connecting the other of said sleeves with said first screw member, and cooperating cam and cam follower elements carried by said sleeves and adapted to cause rotation of said first screw member in response to axial movement of said actuating means in one direction, said lost-motion means embodying a torsion spring adapted to be tensioned by rotation of said other sleeve in one direction and to subsequently impart rotation to said other sleeve in the opposite direction for controlling the cooperation between said cam and cam follower elements.

14. In brake operating mechanism, a housing having a fixed sleeve extending axially thereinto from one end and also having a hollow axial guide projection extending outwardly at its other end, actuating means axially movable in said housing and having oppositely extending hollow guide stems in slidable engagement with said fixed sleeve and said guide projection, a push rod having one end thereof projecting from said housing through said fixed sleeve and its other end extending into said hollow guide projection, an internally threaded first screw member connected with said actuating means, an externally threaded second screw member connected with said push rod and engaging in said first screw member, said screw members forming a thrust transmitting connection between said actuating means and said push rod and said push rod being axially movable for taking up slack in response to rotation of said first screw member, and cam and cam follower elements connected with said fixed sleeve and said first screw member and cooperating to produce rotation of the latter in response to axial movement of said actuating means in one direction.

References Cited in the file of this patent

UNITED STATES PATENTS

| Number | Name | Date |
|---|---|---|
| 685,380 | Johnson | Oct. 29, 1901 |
| 728,443 | Clark | May 19, 1903 |
| 951,577 | Price | Mar. 8, 1910 |
| 1,180,097 | Woods | Apr. 18, 1916 |
| 1,755,305 | Osborn | Apr. 22, 1930 |
| 2,003,769 | Christenson | June 4, 1935 |
| 2,089,491 | Kuiper | Aug. 10, 1937 |
| 2,160,859 | Grayson | June 6, 1939 |
| 2,246,873 | Browall | June 24, 1941 |